United States Patent [19]

Smith

[11] Patent Number: 4,584,325

[45] Date of Patent: Apr. 22, 1986

[54] MODIFIED ALIPHATIC POLYURETHANE POLYMERS AND METHOD OF PREPARING AND USING SAME

[75] Inventor: Stuart B. Smith, Conyers, Ga.

[73] Assignee: Thermocell Development, Ltd., Knoxville, Tenn.

[21] Appl. No.: 727,778

[22] Filed: Apr. 26, 1985

[51] Int. Cl.$^4$ .............................................. C08G 18/14
[52] U.S. Cl. ..................................... 521/99; 264/121; 264/331.19; 427/373; 427/389.8; 521/124; 528/50; 528/75
[58] Field of Search .................. 528/50, 75; 427/373, 427/389.8; 521/99, 124; 264/121, 331.19

[56] References Cited

U.S. PATENT DOCUMENTS

| 4,174,307 | 11/1979 | Rowe | 528/50 |
| 4,182,829 | 1/1980 | Walkowiak et al. | 528/50 |
| 4,218,543 | 8/1980 | Weber et al. | 521/117 |
| 4,267,299 | 5/1981 | Dechsle | 528/66 |

Primary Examiner—Maurice J. Welsh
Attorney, Agent, or Firm—Richard P. Crowley

[57] ABSTRACT

A process of preparing a fast reacting, light stable, sprayable or injectable polyester-modified polyurethane polymer reaction product to prepare coatings or molded products, which process comprises admixing and reacting together: a trimerized or biuret aliphatic polyisocyanate, such as a trimerized or biuret hexamethylene diisocyanate prepolymer; a polyamine to react as a chain extender for the prepolymer, such as for example, a diethyltoluene diamine, in an amount sufficient to react substantially with the free NCO groups of the trimerized or biuret prepolymer; an unsaturated polyester subject to cross linking by the use of a metal salt promotor, such as a cobalt salt promotor, and a peroxide initiator; the cobalt salt and the peroxide initiator present in an amount to provide for the curing of the unsaturated polyester.

29 Claims, No Drawings

MODIFIED ALIPHATIC POLYURETHANE POLYMERS AND METHOD OF PREPARING AND USING SAME

BACKGROUND OF THE INVENTION

Polyurethane polymers are noted as having excellent abrasion resistance, good low temperature flexibility, high modulus and exceptional impact strength in many cases. Most of the polyurethane polymers presently being produced contain aromatic isocyanates, such as MDI or TDI, and are therefore sensitive to ultraviolet radiation, which restricts the use of such polymers in coatings or in molded products, particularly where prolonged outdoor use for such coating and molded products is desired, since long periods of exposure to ultraviolet light causes discoloration of such aromatic polyurethane polymers with a concurrent loss in polymer properties.

It is known that the use of ultraviolet light absorbers, antioxidants, stabilizers, and certain pigments can improve the weatherability of aromatic polyurethane polymers, thus allowing these polymers some limited uses in outdoor application. An exposure of 500 standard fade hours in a fade-o-meter without appreciable change is considered about the maximum exposure which can be obtained with aromatic polyurethane polymers with the use of various additives.

Polyurethane polymers have been prepared employing aliphatic polyisocyanates. However, the high cost of such polymers and the difficulties in manufacturing acceptable aliphatic polyurethane polymers have curtailed the use of aliphatic polyisocyanates, even though such aliphatic polyurethane polymers are far more stable to ultraviolet radiation than the aromatic polyurethane polymers.

Traditionally integrally skinned polyurethane techniques have been successful when using Reaction Injection Molding (known as RIM). However, attempts to apply and use aliphatic polyisocyanates or non-aromatic isocyanates in the RIM techniques have been faced with difficulties such as the low reactivity of the aliphatic isocyanates and the resulting poor mechanical properties of many of such aliphatic polyurethane products. It is believed that the poor mechanical properties of the aliphatic polyurethane products may be attributed to a lack of aromatic rings in the resulting polymers.

Aliphatic polyisocyanates are commercially available in many forms, such as solid materials which must be heated to become liquid for any processing reactions, and liquids which tend to be very high in viscosity, and typically must be diluted by the use of solvents, or materials which are low in viscosity, but tend to have high monomer contents and odor problems associated therewith. One available commercial aliphatic diisocyanate comprises a trimerized hexamethylene diisocyanate prepolymer which contains free NCO groups. Coatings and paints have been prepared employing a solvated trimerized hexamethylene diisocyanate with a saturated polyester resin together with metal salt catalyst. However, such coatings and paints so prepared often require days to come to a complete cure because of the slow reaction time involved.

Polyurethane elastomer moldings having a surface skin have been prepared by a reaction mixture in a reaction injection molding process by reacting polyether polymer triols and/or diols and polyesters with aromatic chain extenders, such as diethyltoluene diamine and aromatic isocyanates, such as MDI (see for example U.S. Pat. No. 4,218,543, hereby incorporated by reference). In this patent polyurethane elastomer moldings have been prepared employing aromatic diamines as chain extenders with 4, 4'-diisocyanatodiphenylmethane polyisocyanates with a polyol having a molecular weight of from about 1800 to 12,000. Reaction injecting molding requires large machines because of the fast reaction and gel times involved, while the presence of urea linkages in the resulting elastomer provides for higher heat distortion temperatures and green strengths. Most RIM parts employing the patent process require post curing and elaborate painting techniques, while the painted parts can scratch easily and chip requiring touchup work.

Solventless compositions for preparing sprayable polyurethanes and poly(urea)urethanes have been disclosed employing an isocyanate terminated prepolymer or a quasi-prepolymer prepared from aromatic isocyanates, such as TDI and MDI, as well as hexamethylene diisocyanate. The isocyanate prepolymer is reacted with a curing agent comprising as essential ingredients, a highly reactive polyol or polyamine or combinations thereof, including for example, a methylenedianiline curing agent together with a less reactive polyol filler. The reaction components are intimately admixed and sprayed through an atomizing nozzle onto a surface to produce the desired polyurethane or poly(urea)urethane coating which is essentially a solventless sprayable coating, but which takes more than 30 minutes to cure (see for example U.S. Pat. No. 4,267,299, hereby incorporated by reference).

Polyurethane coatings have also been prepared by reacting an isocyanate prepolymer, such as a prepolymer based on 1-isocyanato-3,3,5-trimethyl-5-isocyanatomethylcyclohexane with a polyalkylene ether polyol together with an aromatic diamine, such as the aromatic diamines described in U.S. Pat. 4,218,543. The reaction mixture produces an elastomeric polyurethane coating wich is essentially solvent-free or a low solvent coating composition.

SUMMARY OF THE INVENTION

The invention relates to polyester-modified aliphatic polyurethane polymers and to the method of making such polymers and to coated and molded products prepared therewith. In particular, the invention concerns unsaturated polyester modified aliphatic polyurethane polymers which are fast reacting, have high impact strength and good ultraviolet resistance, and which particularly are suitable to prepare coatings by spraying or by spraying or injecting into open or closed molds to provide molded objects, particularly fiber reinforced molded articles.

A fast reacting, ultraviolet resistant, high impact polyester modified aliphatic polyurethane polymer reaction mixture is prepared by admixing and reacting together as a reactive composition:

(a) a trimerized or biuret aliphatic polyisocyanate prepolymer having free NCO groups, such as a trimerized polymethylene polyisocyanate prepolymer, and particularly an essentially solventless or solvent-free trimerized hexamethylene diisocyanate prepolymer;

(b) a polyamine as a chain extender in an amount sufficient to react essentially with all or substantially all of the free NCO groups of the trimerized prepolymer used, such as for example, an aromatic or alicyclic diamine, and more particularly an alkyl substituent aromatic diamine, like diethyltoluene diamine;

(c) an unsaturated polyester having unsaturated groups and optionally a compatible monomer subject to cross linking by the use of promoetors and peroxide-type catalysts, and particularly unsaturated polyesters with low monomer or no monomer content, such as low or no styrene monomer content;

(d) a metal salt promotor for the cross linking of the unsaturated polyester, such as an organo-cobalt to act as a promotor for the cure of the unsaturated polyester; and (e) a peroxide catalyst to act as an initiator agent for the unsaturated polyester. The reactive composition provides for a rapid reaction, typically in less than 10 minutes and often less than 5 minutes, e.g. 2 to 5 minutes, and in which the reactive components may be sprayed or injected onto a substrate using conventional spray or RIM equipment.

The process of the invention is particularly adapted for the use of any sprayable or injectable composition comprising an A component and a B component, which components when sprayed together provide for a reactive admixture and may be sprayed onto or injected into an open or closed mold, but is particularly sprayed onto a fibrous mat, such as a mat of fiberglass, in an open mold process to prepare a high impact strength and high ultraviolet resistant glass fiber reinforced product, or in which chopped fiberglass is introduced during the spraying.

It has been discovered that unsaturated polyesters can be incorporated together with polyamine used to cure aliphatic polyurethane with cobalt promotors and peroxide catalysts together with a trimerized polymethylene diisocyanate prepolymer to produce a polymer reactive product which encompasses the strength of cured polyester resins and yet retains the impact strength of the polyurethanes and the ultraviolet resistance of aliphatic polyurethanes and yet which is fast reactive so that it may be employed for coatings or moldings.

Typically, the normal reaction times of unsaturated polyester to a gel coat condition is normally at 30 to 60 minutes, and further, such unsaturated polyester when sprayed onto a fibrous mat, such as a fiberglass mat wherein the fiberglass acts as a reinforcing fiber, require roll out to eliminate air bubbles on the sprayed mat. Further, fast reacting aromatic diamine chain extenders, such as diethyltoluene diamine, when used with aromatic diisocyanates, which is MDI or TDI, is too fast reacting for spraying or pouring unless very large and expensive spraying techniques and machines are used, which substantially limits the use of such compositions.

The unsaturated polyester modified aliphatic polyurethane reactive products of the invention apparently provide for a dual reaction of both the aliphatic polyurethane prepolymer and the unsaturated polyester. Surprisingly such reactive mixture cures in minutes and can be processed on low cost RIM or spray equipment, and the resulting product has very low odor or toxicity and yet the resulting product provides an enhanced tensile strength, good impact strength and good ultraviolet resistance.

The polyester modified aliphatic polyurethane polymers are prepared by mixing the essential ingredients together typically at room or ambient temperatures, e.g. 50° to 90° F., to provide an exothermic reaction with the polyamine acting as a chain extender and reactant for the trimerized prepolymer with the free NCO groups, and possibly with the hydroxyl groups of the polyester and the promotor and the catalyst acting in the presence of the polyamine to provide a rapid curing reaction for the unsaturated polyester resin. It is important that both a metal salt promotor and a peroxide catalyst be employed in conjunction with the trimerized aliphatic isocyanate prepolymer and the polyamine chain extender in the presence of an unsaturated polyester, since without the metal promotor and catalyst the unsaturated polyester would act merely as a plasticizer-type additive reducing the strength and changing the property characteristics of the resulting aliphatic polyurethane polymer product and producing a more flexible product. If desired, plasticizers including saturated polyesters and polyester resins may be added as optional components.

The reaction is typically carried out by employing an A side and a B side composition, with the A side composition comprising the aliphatic polyisocyanate prepolymer, while the B side composition comprises the polyamine chain extender as well as the unsaturated polyester. The cobalt metal salt promotor and the peroxide initiator are typically separated with the promotor being placed in the A side and the initiator in the B side composition. The process provides for the A and B side compositions to be admixed by spraying onto a substrate such as an open mold. The sprayed reaction mixture gels rapidly and may be removed from the mold, that is demolded for example in 10 minutes or less, typically 2 to 5 minutes, and yet has a high strength on demolding together with good ultraviolet stability, good tensile and good impact strength. The products produced have rigid to semi-flexible properties.

The aliphatic polyisocyanates suitable for use in the invention comprises those trimerized or biuret aliphatic, e.g. polymethylene polyisocyanates and particularly, a trimerized or biuret hexamethylene diisocyanate having free NCO groups and combinations thereof, and typically having up to about 40 percent by weight of the free NCO groups, such as for example from about 5 to 35 and more particularly 18 to 30 percent by weight of free NCO groups. The trimerized aliphatic prepolymers are prepared by reacting the selected polyisocyanate in the presence of one or more trimerization catalysts and conditions to prepare the trimerized prepolymer reaction product. Trimerized prepolymer products having high solid contents for example 80 to 100 percent solids with low viscosities and low odors are preferred. If desired, small amounts of solvent or diluent may be employed, such as for example small amounts, such as 10 percent by weight or less of an aliphatic solvent or a combination of aliphatic and aromatic solvents or diluents may be employed, although are not preferred. The aliphatic polyisocyanates suitable for use in the process preferably are aliphatic diisocyanates which have very low free monomer content, low viscosity for ease in processing, little or no odor, good reactivity with polyamine, and optionally must have clarity where a clear, transparent or translusive reaction product is desired, and be of low toxicity. A particular material which is most suitable is a trimerized or biuret hexamethylene diisocyanate prepolymer generally of 80–100 percent solids, having a free NCO content of about 20 to 25 percent by weight, which is essentially free of solvents and has low odor.

The polyamine employed in the reactive composition typically is a curing agent and chain extender and particularly an aromatic or alicyclic diamine and more particularly an alkyl-substituted aromatic diamine, and more particularly those aromatic diamines as described in U.S. Pat. No. 4,218,543, hereby incorporated by reference. The aromatic diamines should be commmpatible and miscible with the reactive ingredients with which the polyamine is used. The aromatic diamines useful often are low toxicity alkyl substituted diamines. One class of aromatic diamines includes at least one alkyl substituent, e.g. $C_1$–$C_3$ in the ortho position to a first amino group and two alkyl substituents in an ortho position to a second amino group or mixtures of such aromatic diamines. A specially preferred aromatic diamine for use in the invention comprises a dialkyltoluene diamine, such as diethyletoluene diamine (DETDA). The polyamine used in the reactive composition may comprise one or a combination or polyamines, but those polyamines which are liquid and non-toxic and which can react with both the hydroxyl groups of the unsaturated polyester and the free NCO groups of the aliphatic prepolymer are most desirable, such as diethyltoluene diamine (DETDA). Other polyamines are aromatic or alicyclic diamines, such as dimethyl aniline, methylene dianiline or 1,4-diaminocyclohexane, but a dialkyl substituted aromatic diamine such as DETDA is preferred because of its liquid properties and low toxicity.

The unsaturated polyesters useful as cross linkable modifiers in the reactive composition comprise those unsaturated polyesters which are the reaction products or condensation products of a poly, e.g. di or tri acid, and a poly, e.g. di or tri hydroxy compound or polyol wherein one or both, but typically the acid contains ethylenic unsaturation to provide an unsaturated polyester product. The unsaturated polyesters are usually reacted or cross linked through the unsaturated bonds with compatible monomer, such as styrene or dialkyl phthalate. Typical unsaturated acids are dicarboxylic acids, such as maleic and fumaric acid, while typical hydroxy compounds are dihydroxy compounds, such as ethylene, propylene, diethylene, dipropylene glycols and neopentyl glycol (NPG). Monomers used besides styrene and diallyl phthalate include, but are not limited to, acrylates and methacrylates, such as acrylic acid, methylacrylic acid and alkyl acrylates and methacrylates like ethyl acrylate and hydroxy alkyl acrylates and methacrylates. Such unsaturated polyesters and monomer mixtures are sold as ortho and iso NPG gel cost polyesters, as ortho and iso phthalic acid resins, vinylester resins, etc.

Unsaturated polyesters with low or no styrene content are desirable for use and can be prepared from methacrylic acid, propylene oxide, and maleic anhydride to form a maleate polyester which is isomerized by an amine catalyst to a fumurate ester monoalcohol monomer (see U.S. Pat. No. 3,374,299). Unsaturated polyesters (referred to as polyester including from 0 to 40 percent by weight of monomer contained therewith) are subject to cross linking in the presence of a promotor and a peroxide initiator. The useful ethylenically unsaturated cross linkable polyesters may vary in hydroxy number, such as from 35 to 300, more typically about 100 to 200.

A promotor should be employed to promote the reaction of the unsaturated polyester resin employed in the reaction mixture, and typically comprises a metal salt promotor and more particularly and preferred is a cobalt organic metal salt, such as the metal salt prepared from napthenic acids and fatty acids, and more particularly cobalt napthenate and $C_8$–$C_{18}$ cobalt fatty acid metal salts, e.g. cobalt octoate.

The initiator employed to initiate the curing and cross linking of the unsaturated polyester comprises a peroxide or peroxide-type catalyst, such as an aromatic or aliphatic heat reactive peroxide catalyst, and more typically a peroxide catalyst which will provide for the rapid and effective cure of the unsaturated polyester internally or with the monomer in the reactions mixture. Suitable peroxide initiators include for example, but not be limited to an aliphatic peroxide such as a methyl ethyl ketone peroxide or a benzoate-type peroxide catalyst, such as for example but not to be limited to a tertiary alkyl, e.g. butyl perbenzoate and other peroxides generally having 7 to 9 percent of free oxygen.

Commercially available and conventional unsaturated polyesters typically contain up to about 50 percent of a monomer, such as a styrene; however, this monomer is undesirable as cancer causing when sprayed into the air. Attempts have been made to reduce the amount of styrene monomer. The process of the invention permits a reduction in the styrene monomer content up to about 75 percent, and is particularly useful when an unsaturated polyester is employed without any styrene monomer or a very low amount of a styrene monomer. Unsaturated polyester resins without styrene monomer are available and typically used for reactions with aromatic polyisocyanates, however, such polyesters do not react with aliphatic diisocyanates. The employment of the unsaturated polyester with aliphatic isocyanate prepolymers permits the production of hard and semi-flexible polymeric reaction products, while the presence of saturated polyester resins or other materials which are not subject to cross linking act as undesirable plasticizers, and may only be tolerated in low amounts, since the presence of such saturated polyester resin results in a more flexible product without all the advantages of the reactive product of the present invention.

The reaction may be carried out in the presence of other additives, such as for example in the presence of selected flame retardants, such as phosphate, halogenated or halogenated-phosphate compounds or hydrated alumina in amounts of up to 20 percent by weight of the total composition and more particularly 2 to 10 percent by weight. In addition, the reaction may be carried out in the presence of a sufficient amount of a blowing agent to provide a foam product. Such a blowing agent would comprise for example a liquid halocarbon, such as a fluorocarbon and more particularly a chlorofluoromethane or ethane, such as fluorotrichloromethane so as to provide a closed-cell foam reacting composition. A blowing agent may be employed in a sufficient amount to provide the desired density, such as from 2 to 30 pounds density ranging from about 1 to 20 parts by weight of a blowing agent for 100 parts of the total of the trimerized aliphatic polyurethane prepolymer and polyester employed; for example, from about 5 to 15 parts by weight. Where a blowing agent is employed, there is also generally employed a surfactant or cell-control agent, typically a silicone surfactant or a silicone glycol surfactant in an amount ranging from 0.5 to 3 parts by weight.

Other additives as desired may be used, such as for example, but not limited to: catalysts; solvents and diluents, such as toluene, xylene and ethylene acetate glycol; moisture scavenging agents; accelerators; antioxidents; coupling agents; flame retardants; stabilizers; lubricants; surfactants; viscosity control agents; plasticizers; biocides; antistatic agents; polymeric and resin additives; fibrous reinforcing agents, such as chopped glass fibers; fillers, pigments, dyes, and the like.

The reaction product is prepared by mixing, such as by spraying or injecting the components together to provide an exothermic reaction and the production of the resulting light stable reaction product. The A side composition comprises the trimerized polymethylene diisocyanate together with any other components compatible therewith and usually includes the peroxide polyester catalyst. The B side composition comprises the diamine chain extender and together with other components typically added to the B side such as surfactants, blowing agents, and the like, including the unsaturated polyester and the polyester cobalt promotor. Where reinforcing fibers, fillers or pigments are employed, these may be incorporated in the B side mixture or sprayed directly into the reaction mixture with a separate nozzle or the reaction mixture of A and B may be sprayed directly onto the mat of the reinforcing fibers, such as with the use of glass fibers in a mold set-up.

Generally, the A and B compositions are placed in separate containers and then are sprayed by a variable or fixed equal-volume spray nozzle together onto a substrate. Where a solid coating or a solid elastomer RIM product is desired, the reaction is carried out in the absence or substantial absence of any moisture or blowing agent to provide for a solid RIM product or coating composition of desired properties and thickness. However, if desired, a blowing agent and a surfactant may be incorporated to provide for a coating or a foam molded product. The reaction mixture may be sprayed, poured or injected to produce solid or foam coatings or moldings on a variety of substances, such as on glass or synthetic fibers or woven or non-woven substrates to produce mats or a coated natural metal foil, like aluminum foil, wood, steel or other surfaces. If desired, where the reaction mixture is applied to a surface coating or substrate, the surface coating or substrate may be preheated prior to the application of the reaction mixture, particularly if a thin coating or mold foam is desired. The reaction mixture is particularly characterized by a fast cure time, and light stable, elastomeric, aliphatic polyester-polyurethane coatings and mold products.

The amount of the respective components in the mixture may vary, and typically the B side compositions should have the polyamine in a total stoichiometric amount at or slightly above a stoichiometric amount based on the free NCO groups of the prepolymer, for example, about 10 to 100 parts of the diamine, for example, 20 to 80 and more particularly 30 to 70 parts by weight are employed per 100 parts by weight of the aliphatic diisocyanate in the A side composition. For example, in employing a diethyltoluene diamine, one part of the DETDA reacts with two parts of the polymethylene diisocyanate. The polyamine should be present in about a minimum stoichiometric amount to react with the free NCO group of the prepolymer as a chain extender and in a maximum amount to react with the free OH groups of the unsaturated polyester to act as an amine cross linking agent. Thus, the polyamine, preferably DETDA, may act in a dual function with both the prepolymer and the polyester to provide the polyester-modified polyurethane product.

The amount of the unsaturated polyester depends on the properties desired in the resulting polyester-modified polyurethane polymer. As the level of the polyester in the admixture is increased, the resulting reaction product has a higher flex modulus, i.e. more flexible and higher tensile strength, while lower levels of polyester provide a more rigid reaction product. Generally, 10 to 150 parts by weight, such as 25 to 125 parts of polyester may be used for 100 parts by weight of the trimerized prepolymer. The amount of polyester initiator used may vary, but should be sufficient to provide initiating of the polyester reaction, e.g. a peroxide agent usually in an amount of 0.5 to 10 parts, e.g. 2 parts to 6 parts by weight per 100 parts by weight of the polyester. The peroxide is used in the A side composition with the prepolymer. Also employed is a sufficient amount of a metal-organic promotor particularly a cobalt promotor to promote a rapid curing reaction of the polyester. Cobalt promotors are usually placed in the B composition and used in an amount of from about 0.05 to 2.0 parts by weight, e.g. 0.1 to 1.0 parts by weight per 100 parts by weight of the unsaturated polyester. In practice additional components may be added to the B side mixture, such as a flame retardant to impart flame retardance and improved fire resistant properties to the resulting product or blowing agents and surfactants or other additives as desired.

Spraying or injecting the compositions A and B together provides for a light stable, polyester modified, aliphatic polyurethane reaction product with a fast gelling and reaction or curing time, typically less than, for example, 20, such as 15 to 10 seconds, and which when sprayed in an open mold may be demolded in less than, for example, 3 to 10 minutes. In one embodiment the reaction mixture may be sprayed or injected onto a layer of fiberglass, for example, in 50 to 100 mils thickness and then successive layers built-up on top of the sprayed layer employing, for example, ¼ inch chopped fiberglass sprayed into the reaction mixture to provide a light stable, fiber reinforced, hard molded product.

The invention will be described for the purposes of illustration only in connection with certain illustrative embodiments; however, it is recognized that various changes, additions, and improvements may be made by those persons skilled in the art all falling within the spirit and scope of the invention.

DESCRIPTION OF THE EMBODIMENTS

EXAMPLE 1

A and B compositions were prepared as follows:
A side:
(1) 60 parts by weight trimerized hexamethylene diisocyanate prepolymer (22 percent NCO, viscosity 2,000 cps) (N-100 A, Mobay Chemical Corp.)
(2) 3.0 parts by weight methyl ethyl ketone peroxide initiator MEKP (Lucidol DDM-9, Ludicol Corp.)
B side:
(1) 20 parts by weight diethyltoluene diamine (DETDA)
(2) 0.2 parts by weight cobalt napthenate promotor
(3) 80 parts by weight unsaturated polyester* (* following unsaturated polyesters used):
   (a) neopentyl glycol-maleate gel coat polyester with styrene monomer (Coating & Plastics Inc. #3467)
   (b) propylene glycol-maleate with styrene monomer (Coating & Plastics Inc. #3420)

(c) vinyl ester polyester with styrene monomer (Iso resin polyester, Ferro Corporation)
(d) unsaturated monoalcohol resins without styrene (Ashland Chemical Co., Hetron 922)

The A and B side components were mixed for 10 minutes to ensure good mixing. The B side composition was placed in a tank with 3 psi air pressure, the A side composition was also put in a separate tank under 3 psi dry air pressure.

The materials were recirculated through high pressure stainless steel rotating pumps. The ratios were set 100 PBW B to, 63 PBW A. The material was injected into closed molds 12'×12'×⅛' made of silicone rubber, polyester, and aluminum at 350 psi mixing pressure. After 120 seconds in the mold, the part was ejected without any need for mold release. A very hard part with good impact resistance and high gloss was produced.

No appreciable difference was noticed with any of the unsaturated polyesters used except the Ashland Hetron resin which was different in that it produced a semi-flexible molded part, but again no mold release was needed.

EXAMPLE 2

An internally mixed spray gun with a fiberglass chopper was put on the machine. Open polyester molds and open aluminum molds were used. The same ratios as in Example 1 with 350 psi spraying pressures were tried. The formulations of Example 1 were sprayed into the molds to the desired thickness without running with up to 36 percent chopped glass being introduced into the flat spray pattern. After 2 minutes on the mold the molded parts were demolded without any use of mold release, the molded parts had excellent surface appearance, good hardness, high gloss, good impact strength and no entrapped air bubble.

EXAMPLE 3

A cobalt organo complex known as Pep 183 S from Air Products was substituted for cobalt napthenate as a promotor and tertiary butyl perbenzoate was substituted for MEKP in the previous example. In each example a semi-flexible product was produced instead of a rigid product, but mold release, gloss and strength as before were still present.

EXAMPLE 4

Tests were conducted to determine the self-life of adding the peroxide initiator of Example 1 to the isocyanate prepolymer component in the A side composition. The results showed no change in reactivity up to 6 weeks storage.

EXAMPLE 5

Standard color concentrates used for unsaturated polyesters were used in the formulations of Example 1. No changes in processing were observed. The amine DETDA can change color from clear to red if not kept under a dry air or nitrogen blanket. This action could effect light color in that more color concentrate may be needed to overcome the amber color.

EXAMPLE 6

Exposure of the molded products of Example 1 to an Xenon Arc weatherometer for up to 5000 hours has shown no color changes or loss in properties.

EXAMPLE 7

Example 1 is repeated to prepare a flame retardant, aliphatic polyurethane reaction product by adding 10 parts by weight to component B of Antiblaze 80, a trichloroethyl phosphate from Mobil Chemical Company.

EXAMPLE 8

A closed cell, flexible, skinned foam product is prepared having a density of about 10 to 12 pounds per cubic foot with fine cells by adding 10 parts by weight of Freon 11 (Dupont Co.) to the B side composition, together with one part by weight of a silicone surfactant, (5422 surfactant of Union Carbide Corporation) to prepare an elastomeric fine cell foam molded material.

EXAMPLE 9

A reactive mixture was prepared under the same spraying conditions as in Example 1 wherein the A side component comprised 50 parts by weight of the hexamethylene diisocyanate (1-2291 A) and the B side component comprised solely 25 parts by weight of diethyltoluene diamine (DETDA). After curing a very hard, brittle reaction product resulted without effective mold release which product was not satisfactory.

EXAMPLE 10

Example 1 is repeated as employing a hexamethylene diisocyanate prepolymer (L2291 A, Mobey Chemical Corp.) 23.5 percent free NCO. The reaction profile and the reaction product obtained was substantially the same as Example 1.

The new aliphatic unsaturated polyester modified polyurethane polymer products can be used in any applicator that standard aromatic isocyanates are being used with resulting better physical properties and ultraviolet stability. The new system replaces gel coats and polyester resins in a fiberglass shop with reductions in toxic styrene monomer levels, labor cycle time and the use of mold release agents.

What is claimed is:
1. A process for preparing a light stable, fast reacting, polyester-modified aliphatic polyurethane polymeric reaction product, which process comprises admixing and reacting a composition, which composition comprises:
  (a) 100 parts by weight of a trimerized or biuret polymethylene polyisocyanate prepolymer having free NCO groups;
  (b) 10 to 150 parts by weight of an unsaturated polyester prepared by the reaction of an unsaturated polycarboxylic acid with a polyhydroxyl compound, and which polyester contains from about 0 to 40 percent by weight of a compatible unsaturated monomer adapted for a cross linking reaction with the unsaturated polyester;
  (c) a metal salt promotor for the unsaturated polyester to promote the cross linking of the unsaturated polyester, the metal salt promotor present in an amount sufficient to promote a cross linking reaction;
  (d) a peroxide initiator for the unsaturated polyester in an amount sufficient to initiate the cross linking reaction of the unsaturated polyester; and
  (e) an aromatic or cycloaliphatic polyamine in a stoichiometric amount ranging from the amount to react with all or substantially all of the free NCO groups of the prepolymer and in a maximum amount to also react with the hydroxyl groups of the unsaturated polyester.

2. The process of claim 1 wherein the polymethylene polyisocyanate prepolymer comprises a trimerized or biuret hexamethylene diisocyanate prepolymer.

3. The process of claim 1 wherein the prepolymer comprises from about 20 to 25 percent by weight of free NCO groups.

4. The process of claim 1 wherein the polyamine comprises a dialkyl substituted aromatic diamine.

5. The process of claim 1 wherein the polyamine comprises diethyltoluene diamine.

6. The process of claim 1 wherein the polyamine comprises from about 10 to 50 parts by weight of the prepolymer.

7. The process of claim 1 wherein the metal salt promotor comprises from about 0.05 to 3 parts by weight of the unsaturated polyester.

8. The process of claim 1 wherein the metal salt promotor comprises an organo-cobalt promotor.

9. The process of claim 1 wherein the peroxide initiator comprises from about 0.5 to 10 parts by weight of the unsaturated polyester.

10. The process of claim 9 wherein the peroxide initiator comprises methyl ethyl ketone peroxide or an alkyl perbenzoate.

11. The process of claim 1 wherein the unsaturated polyester contains from about 0 to 40 percent by weight of a styrene or a diallyl phthalate.

12. The process of claim 1 wherein the unsaturated polyester is prepared by the reaction of a dicarboxylic ethylenically unsaturated acid with a di or tri polyol, and wherein the hydroxyl number of the polyester ranges from about 35 to 300.

13. The process of claim 1 wherein the unsaturated polyester is prepared by the reaction of a maleic or fumaric acid with propylene glycol or neopentyl glycol, and wherein the compatible unsaturated monomer comprises acrylic acid, methyl acrylic acid, an alkyl acrylate or alkyl methacrylate or combinations thereof.

14. The process of claim 1 wherein the composition includes a flame retardant amount of a flame retardant compound.

15. The process of claim 1 which includes a blowing amount of a blowing agent and a surfactant to provide for a polymeric foam reaction product.

16. The process of claim 1 which includes admixing and reacting the composition by spraying an A side composition and a B side composition onto a substrate surface wherein the A side composition comprises the trimerized prepolymer and the peroxide initiator and the B side composition comprises the unsaturated polyester, the metal salt promotor and the polyamine.

17. The process of claim 16 which includes spraying the A and B side mixture onto a substrate which contains a fiber strengthening amount of a fibrous material.

18. The process of claim 17 wherein the fibrous material comprises a glass fiber mat.

19. The process of claim 16 which includes injecting chopped fiberglass into the sprayed reaction mixture of the A and B side composition.

20. The process of claim 16 which includes reacting the A side and B side composition together by injecting the compositions onto the substrate surface of an open mold.

21. The reaction product produced by the process of claim 1.

22. The reaction product produced by the process of claim 18.

23. A process for preparing a light stable, fast reacting, polyester modified polyurethane reaction polymer reaction product, which process comprises admixing and adding together:

(a) an A side composition which comprises 100 parts by weight of a trimerized or biuret hexamethylene diisocyanate prepolymer having from about 20 to 25 percent by weignt of free NCO groups and about 0.5 to 10 parts by weight of a organo peroxide initiator; and (b) a B side composition which comprises an ethylenically unsaturated polyester prepared by the reaction of an unsaturated dicarboxylic acid with a polyhydroxyl organic compound and which contains from about 0 to 40 percent by weight of a compatible ethylenically unsaturated monomer for a cross linking reaction with the unsaturated polyester, the polyester having a hydroxyl number of from about 100 to 200, and an organo-cobalt promotor in an amount of about 0.05 to 2 parts by weight of the polyester and from about 5 to 100 parts by weight of a dialkyl substituted aromatic diamine.

24. The process of claim 23 wherein the aromatic diamine comprises diethyltoluene diamine.

25. The process of claim 23 wherein the aromatic diamine comprises from about 10 to 50 parts by weight.

26. The process of claim 23 wherein the unsaturated polyester is prepared by the reaction of an acrylate, a propylene oxide and a maleate, and which is substantially free of a styrene monomer.

27. The process of claim 23 which includes spraying the compositions A and B together onto an open mold substrate which contains a mat of fiberglass to prepare a fiberglass containing molded product, and removing the reactive polymeric product from the open mold.

28. The reaction product prepared by the process of claim 23.

29. The reaction product prepared by the process of claim 27.

* * * * *